United States Patent
Horie et al.

(10) Patent No.: US 10,628,307 B2
(45) Date of Patent: *Apr. 21, 2020

(54) COORDINATING HEAP CONTRACTION OF MULTIPLE RUNTIMES IN THE CLOUD ENVIRONMENT

(71) Applicant: INTERNATIONAL BUSINESS MACHINES CORPORATION, Armonk, NY (US)

(72) Inventors: Michihiro Horie, Tokyo (JP); Hiroshi H. Horii, Tokyo (JP); Kazunori Ogata, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 15/589,524

(22) Filed: May 8, 2017

(65) Prior Publication Data

US 2018/0322047 A1 Nov. 8, 2018

(51) Int. Cl.
*G06F 12/00* (2006.01)
*G06F 17/30* (2006.01)
*G06F 12/02* (2006.01)
*G06F 11/34* (2006.01)

(52) U.S. Cl.
CPC .......... *G06F 12/0261* (2013.01); *G06F 11/34* (2013.01); *G06F 12/023* (2013.01); *G06F 12/0253* (2013.01); *G06F 2212/1044* (2013.01); *G06F 2212/154* (2013.01); *G06F 2212/163* (2013.01)

(58) Field of Classification Search
None
See application file for complete search history.

(56) References Cited

U.S. PATENT DOCUMENTS

| | | | |
|---|---|---|---|
| 6,286,016 B1* | 9/2001 | Heller | G06F 12/0269 |
| 2002/0095453 A1* | 7/2002 | Steensgaard | G06F 9/5016 |
| | | | 718/107 |
| 2009/0070776 A1 | 3/2009 | Dahlstedt | |
| 2011/0320682 A1 | 12/2011 | McDougall et al. | |
| 2012/0222005 A1* | 8/2012 | Harris | G06F 9/45504 |
| | | | 717/120 |
| 2013/0304771 A1 | 11/2013 | Khanna | |
| 2014/0324924 A1 | 10/2014 | Ahad et al. | |
| 2015/0026428 A1 | 1/2015 | Bobroff et al. | |
| 2016/0070593 A1 | 3/2016 | Harris et al. | |

* cited by examiner

*Primary Examiner* — Tuan A Pham
(74) *Attorney, Agent, or Firm* — Tutunjian & Bitetto, P.C.; Vazken Alexanian

(57) ABSTRACT

A computer-implemented method and computer processing system are provided for coordinated heap contraction. The method includes starting a contraction of a heap responsive to a physical memory use of the heap approaching a limit. The contraction starts from a particular runtime system that as estimated to be slowest for the contraction from among a plurality of runtime systems that use the heap, based on previously determined estimates. The method also includes decreasing the physical memory use of the heap by compacting the heap with only one Garbage Collection (GC) thread, responsive to the contraction of the heap being unable to catch up to the physical memory use.

8 Claims, 7 Drawing Sheets

COORDINATING HEAP CONTRACTION OF MULTIPLE RUNTIMES IN THE CLOUD ENVIRONMENT

BACKGROUND

Technical Field

The present invention relates generally to cloud computing and, in particular, to coordinating heap contraction of multiple runtimes in the cloud environment.

Description of the Related Art

In the cloud environment, it is important to increase memory density by adjusting occupied memory size under a memory-overcommitted situation. In such an environment, it is presumed that multiple runtime systems such as Java® Virtual Machine (JVM®) are running in a heterogeneous manner, that is, some runtimes use plenty of its heap memory because of the many allocation of objects in the application, some applications use less heap memory. Hence, it is desirable to provide memory resources fairly to all of the runtimes.

When the available physical memory becomes small, it is desirable to avoid memory swap-out by shrinking the heap memory of each runtime. When the available physical memory becomes larger, the heap memory should be expanded again.

In order to change the limitation of the heap size from minimum (that is configurable with -Xms in the JVM® argument) to maximum that is configurable with -Xmx in the JVM argument), the softmx provided by J9 JVM® can be used. Softmx is a technique to free physical memory attached, to an empty region in a heap memory. The empty region can be created after compaction in Garbage Collection (GC).

The amount of time for shrinking the heap until the specified size by softmx depends on the application behavior. If there are many vacancies in the heap, then the heap can be shrunk relatively quickly. In contrast, if there are few vacancies, it will take more time for the heap shrink. The amount of time depends the size of the empty region after compaction. If the heap memories of each runtime are shrunk all together, some heap memory will not be shrunk adequately, and thus, memory swap-out can occur.

Thus, there is a need for improved heap contraction of multiple runtimes in a cloud environment.

SUMMARY

According to an aspect of the present invention, a computer-implemented method is provided for coordinated heap contraction. The method includes starting a contraction of a heap responsive to a physical memory use of the heap approaching a limit. The contraction starts from a particular runtime system that was estimated to be slowest for the contraction from among a plurality of runtime systems that use the heap, based on previously determined estimates. The method also includes decreasing the physical memory use of the heap by compacting the heap with only one Garbage Collection (GC) thread, responsive to the contraction of the heap being unable to catch up to the physical memory use.

According to another aspect of the present invention, a computer program product is provided for coordinated heap management. The computer program product includes a non-transitory computer readable storage medium having program instructions embodied therewith. The program instructions are executable by a computer to cause the computer to perform a method. The method includes starting a contraction of a heap responsive to a physical memory use of the heap approaching a limit. The contraction starts from a particular runtime system that was estimated to be slowest for the contraction from among a plurality of runtime systems that use the heap, based on previously determined estimates. The method further includes decreasing the physical memory use of the heap by compacting the heap with only one Garbage Collection (GC) thread, responsive to the contraction of the heap being unable to catch up to the physical memory use.

According to yet another aspect of the present invention, a computer processing system is provided for coordinated heap contraction. The system includes a processor. The processor is configured to start a contraction of a heap responsive to a physical memory use of the heap approaching a limit. The contraction starts from a particular runtime system that was estimated to be slowest for the contraction from among a plurality of runtime systems that use the heap, based on previously determined estimates. The processor is further configured to decrease the physical memory use of the heap by compacting the heap with only one Garbage Collection (GC) thread, responsive to the contraction of the heap being unable to catch up to the physical memory use.

These and other features and advantages will become apparent from the following detailed description of illustrative embodiment thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to coordinating heap contraction of multiple runtimes in the cloud environment.

In an embodiment, the present invention shrinks the heap memory to avoid memory swap-out, when the size of the available physical memory becomes small. In an embodiment, the heap memory is expanded, when the size of the available physical memory becomes large.

In an embodiment, a decision is made on when to start the heap shrink by softmx for each of the heap memory separately, based on the estimation of how quickly each heap can be shrunk.

Figure 1:
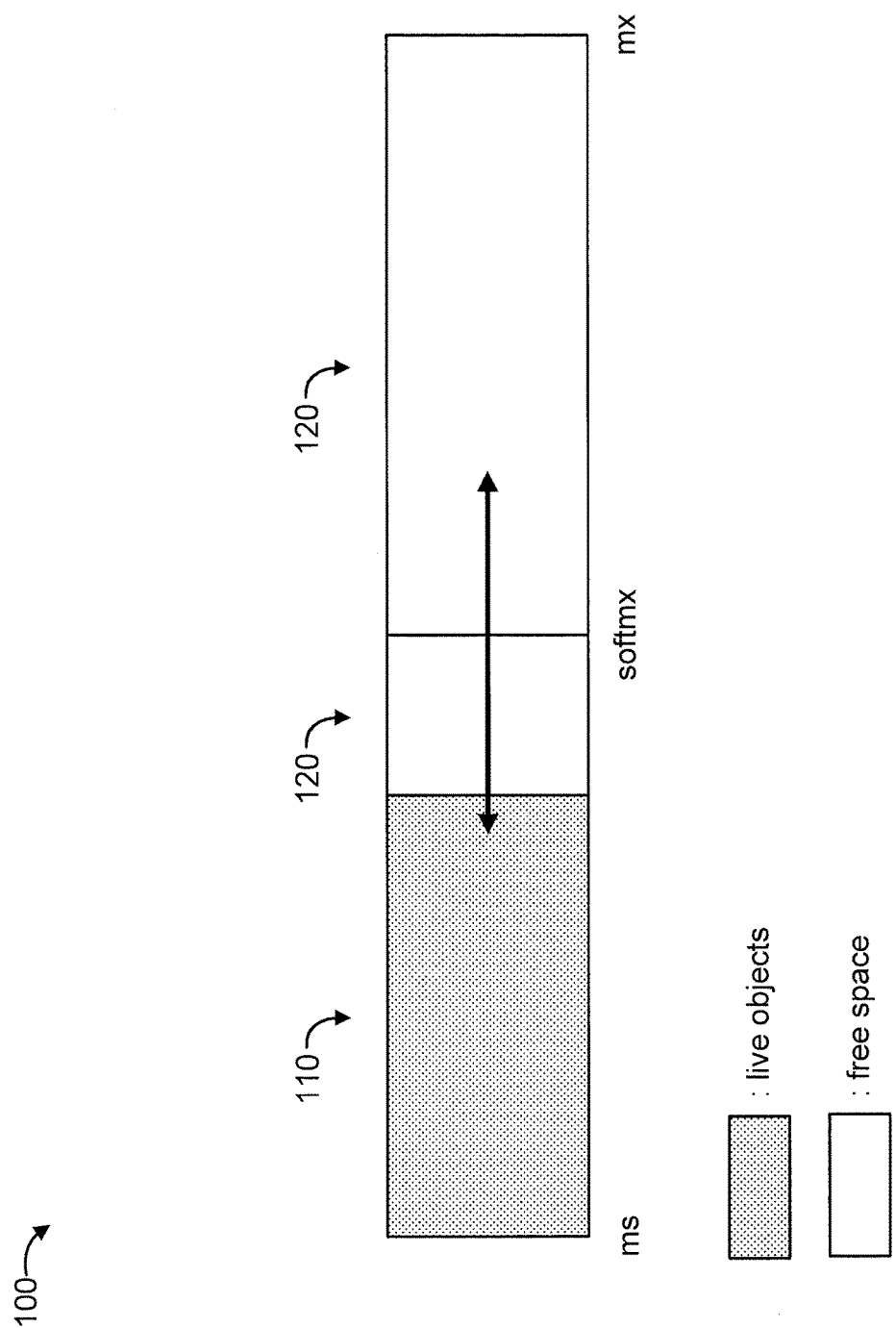
FIG. 1 shows an exemplary heap, to which the present invention can be applied, in accordance with an embodiment of the present invention.

FIG. 1 shows an exemplary heap 100, to which the present invention can be applied, in accordance with an embodiment of the present invention.

The heap 100 includes live objects (shown using a dotted hatch scheme) 110 and free space (shown without hatching) 120. The term "mx" denotes the maximum size of the heap. The term "ms" denotes the initial size of the heap. The term "softmx" denotes a dynamic heap adjustment value to which a size of the free space in the heap is dynamically adjusted.

Figure 2:
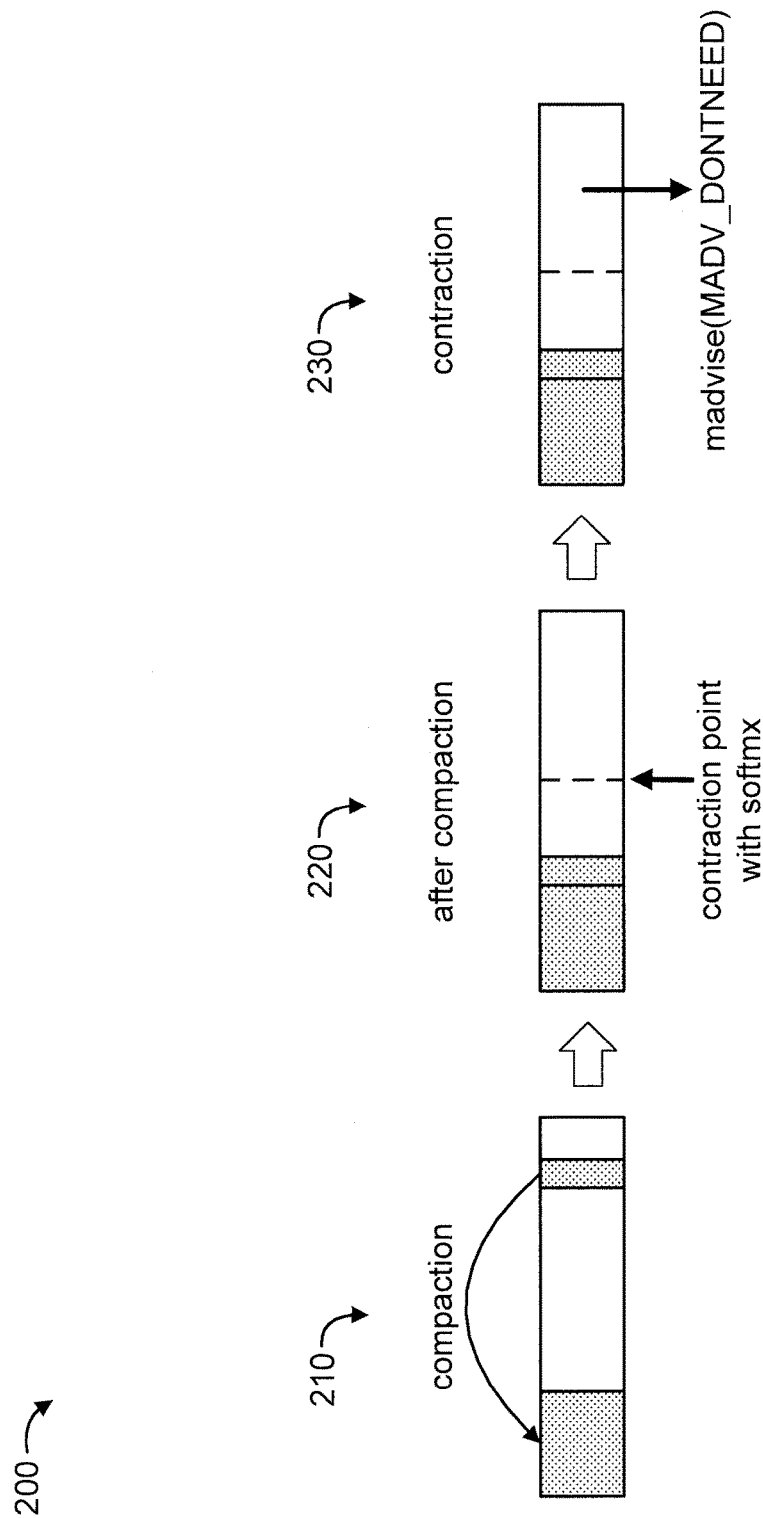
FIG. 2 shows a heap in various stages, to which the present invention can be applied, in accordance with an embodiment of the present invention.

FIG. 2 shows a heap 200, during and after compaction and the heap resultant contraction, to which the present invention can be applied, in accordance with an embodiment of the present invention. In an embodiment, the GC used can only contract contiguous blocks of memory from the end of the heap, so a compaction is used to contract the heap.

During compaction 210 of the heap 200, the intent is to free up fragmented space by moving a fragmented live object 211 to be contiguous with live objects 210.

After compaction 220 of the heap 200, the live object 211 is now contiguous with live objects 210. However, the contraction point 277 with softmx shows that there still plenty of memory space remaining after the contraction point 277.

The resultant contraction 230 of the heap 200 shows an area likely to not be needed for a while that is labelled by the following system call and corresponding (advise) argument: madvise(MADV_DONTNEED).

Thus, as can be seen, the use of softmx without more causes the available physical memory to be shrunk to the value specified by softmx irrespective of the size of the available physical memory.

Figure 3:
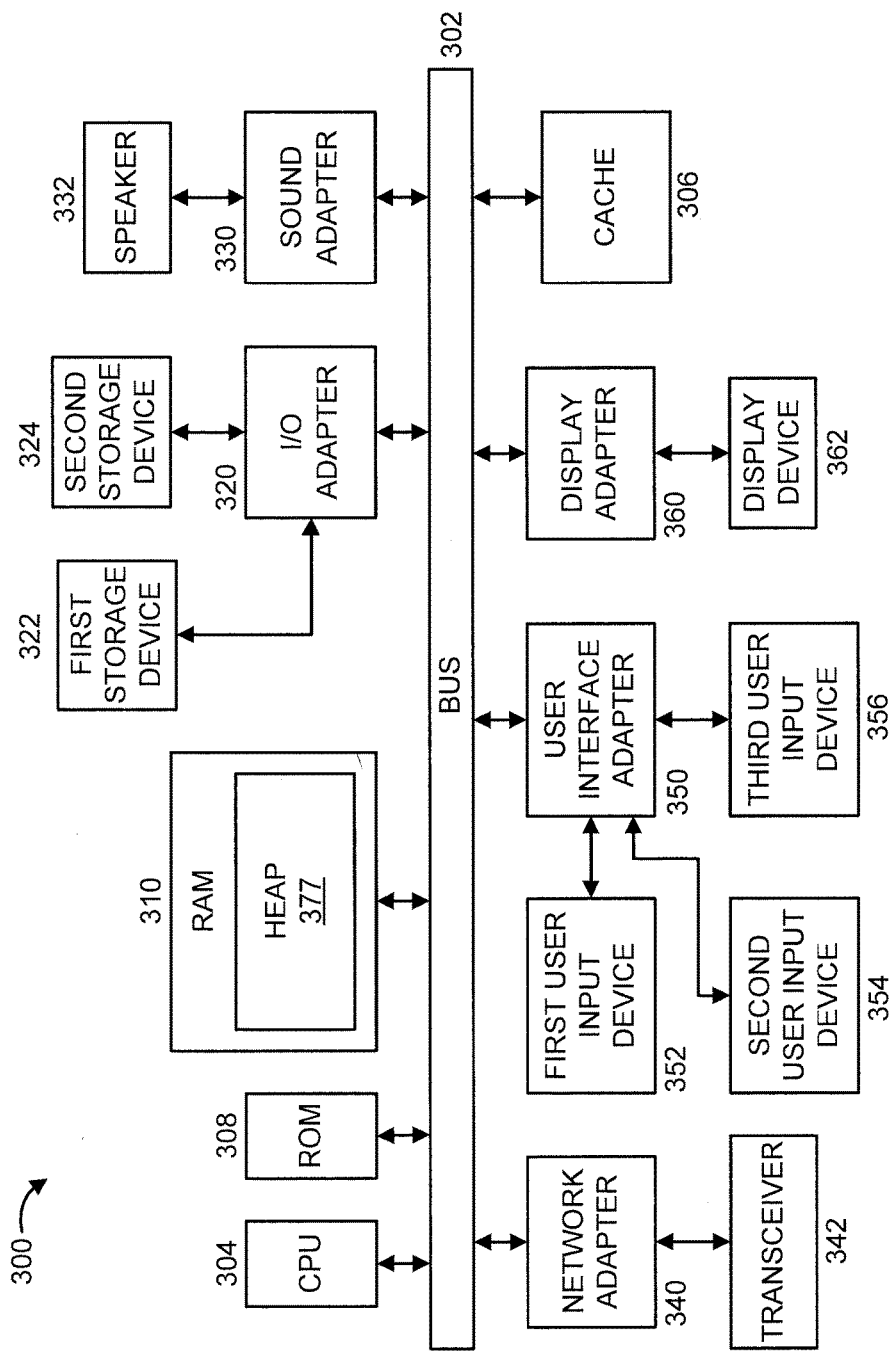
FIG. 3 shows an exemplary processing system to which the present invention may be applied, in accordance with an embodiment of the present invention.

FIG. 3 shows an exemplary processing system 300 to which the present invention may be applied, in accordance with an embodiment of the present invention. The processing system 300 includes at least one processor (CPU) 304 operatively coupled to other components via a system bus 302. A cache 306, a Read Only Memory (ROM) 308, a Random Access Memory (RAM) 310, an input/output (I/O) adapter 320, a sound adapter 330, a network adapter 340, a user interface adapter 350, and a display adapter 360, are operatively coupled to the system bus 302. The RAM 310 includes a heap 310A.

A first storage device 322 and a second storage device 324 are operatively coupled to system bus 302 by the I/O adapter 320. The storage devices 322 and 324 can be any of a disk storage device (e.g., a magnetic or optical disk storage device), a solid state magnetic device, and so forth. The storage devices 322 and 324 can be the same type of storage device or different types of storage devices.

A speaker 332 is operatively coupled to system bus 302 by the sound adapter 330. A transceiver 342 is operatively coupled to system bus 302 by network adapter 340. A display device 362 is operatively coupled to system bus 302 by display adapter 360.

A first user input device 352, a second user input device 354, and a third user input device 356 are operatively coupled to system bus 302 by user interface adapter 350. The user input devices 352, 354, and 356 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 352, 354, and 356 can be the same type of user input device or different types of user input devices. The user input devices 352, 354, and 356 are used to input and output information to and from system 300.

Of course, the processing system 300 may also include other elements (not shown), as readily contemplated by one of skill in the art, as well as omit certain elements. For example, various, other input devices and/or output devices can be included in processing system 300, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 300 are readily contemplated by one of ordinary skill in the art given the teachings of the present invention provided herein.

Figure 6:
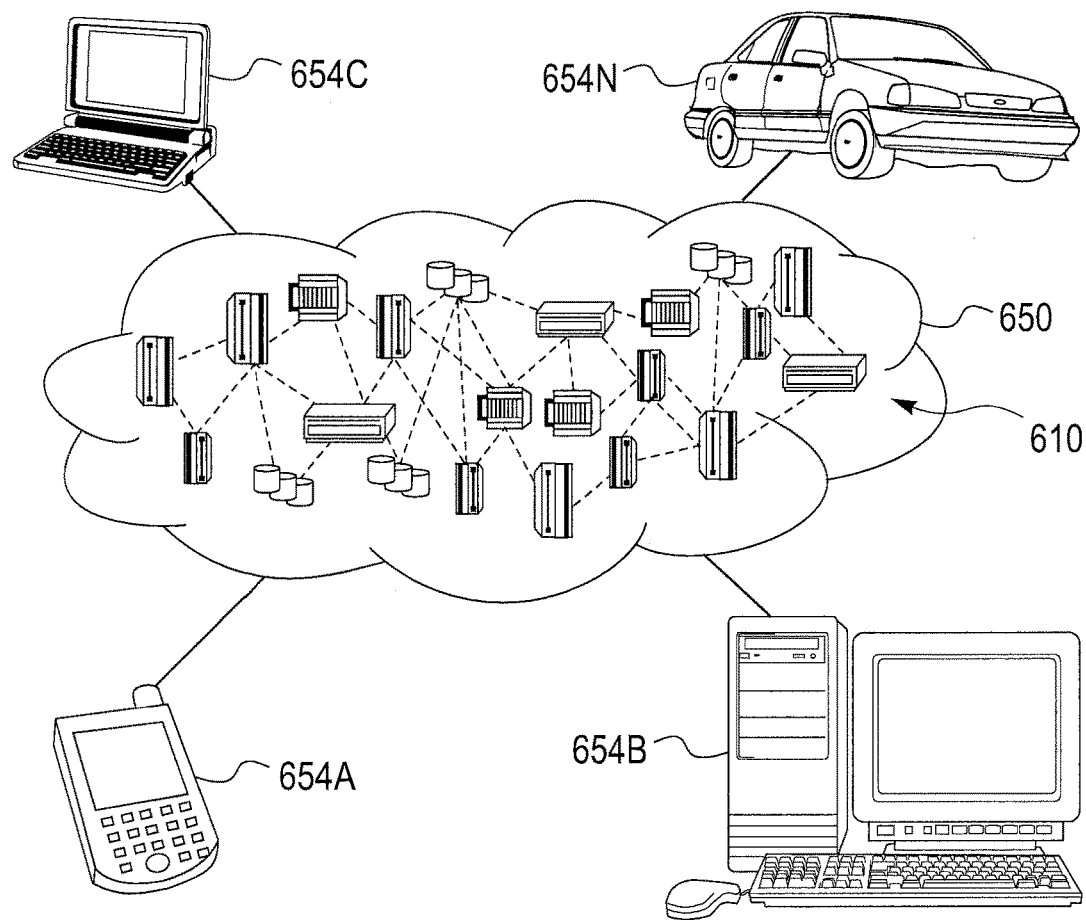
FIG. 6 shows a cloud computing environment, in accordance with an embodiment of the present invention.

Moreover, it is to be appreciated that environment 650 described below with respect to FIG. 6 is an environment for implementing respective embodiments of the present invention. Part or all of processing system 300 may be implemented in one or more of the elements of environment 650.

Figure 4:
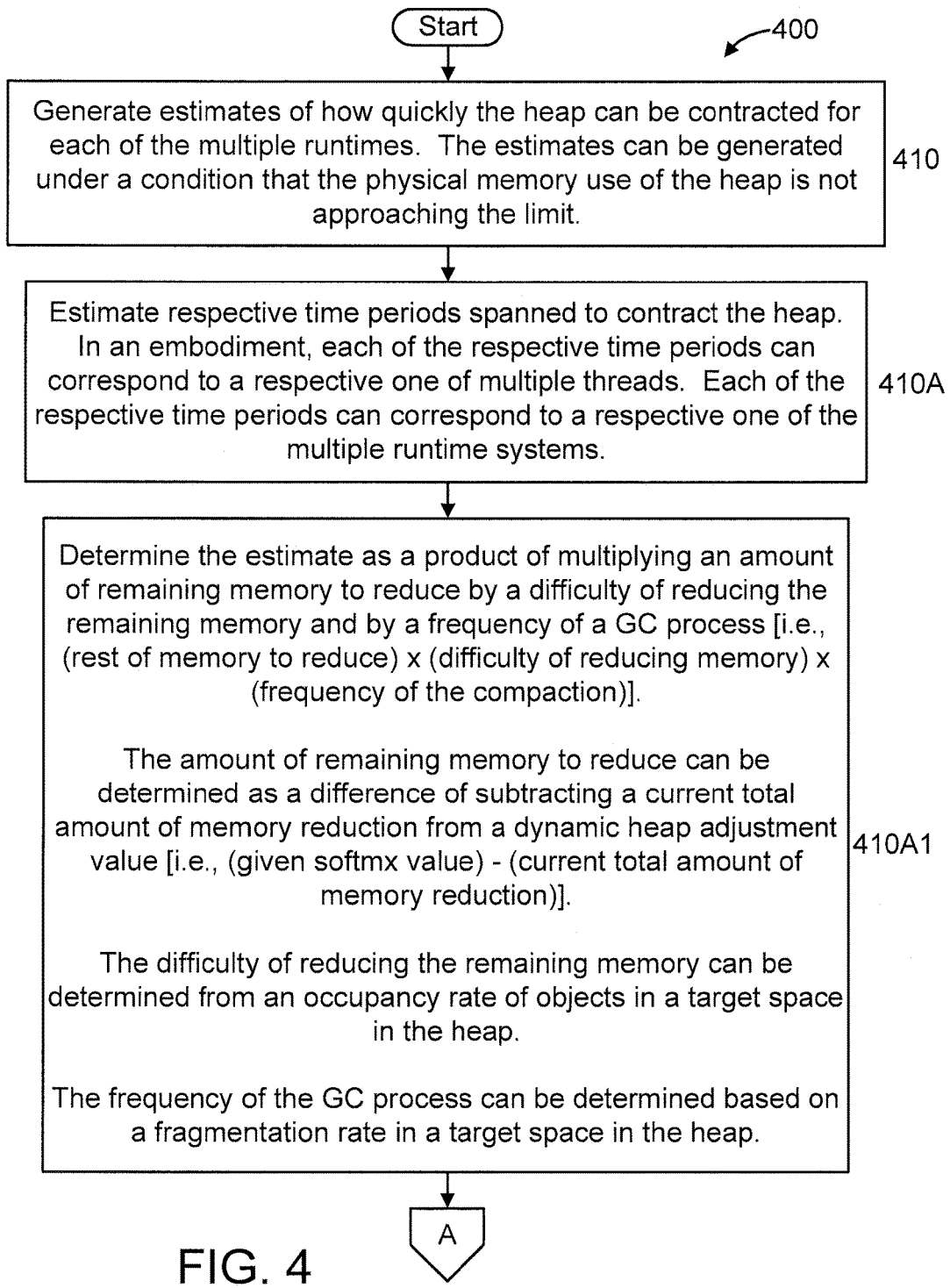
FIGS. 4-5 show an exemplary method for coordinated heap management for multiple runtimes in a cloud environment, in accordance with an embodiment of the present invention.
Figure 5:
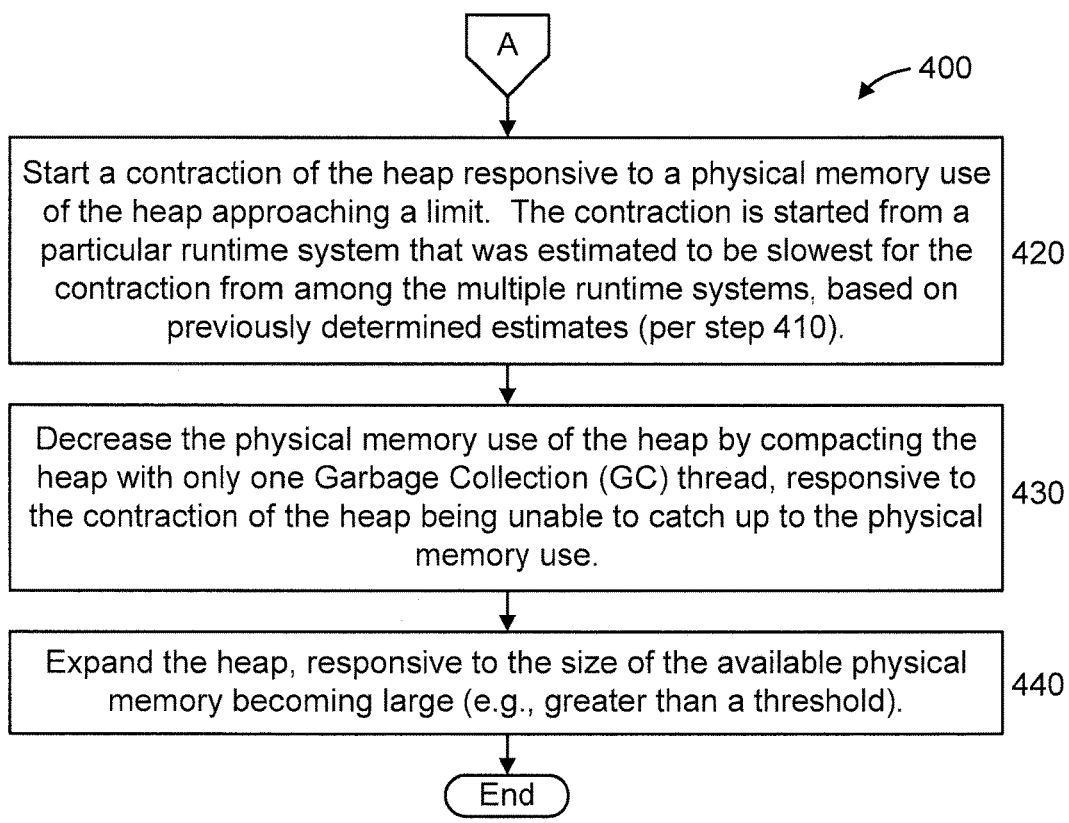

Further, it is to be appreciated that processing system 300 may perform at least part of the method described herein including, for example, at least part of method 400 of FIGS. 4-5. Similarly, part or all, of environment 650 may be used to perform at least part of method 400 of FIGS. 4-5.

FIGS. 4-5 show an exemplary method 400 for coordinated heap management for multiple runtimes in a cloud environment, in accordance with an embodiment of the present invention. In an embodiment, method 400 can be implemented in an environment where the multiple runtime systems have (i) a first method of decreasing memory little by little with low cost and (ii) a second method for decreasing memory surely but with higher cost (than the first method). It is presumed that the second method will be used to decrease the memory by larger amounts than the first method.

At step 410, generate estimates of how quickly the heap can be contracted for each of the multiple runtimes. In an embodiment, the estimates can be generated under a condition that the physical memory use of the heap is not approaching the limit.

In embodiment, step 410 includes step 410A.

At step 410A, estimate respective time periods spanned to contract the heap. In an embodiment, each of the respective time periods can correspond to a respective one of multiple threads. In an embodiment, each of the respective time periods can correspond to a respective one of the multiple runtime systems.

In an embodiment, step 410A includes step 410A1.

At step 410A1, determine the estimate as a product of multiplying an amount of remaining memory to reduce by a difficulty of reducing the remaining memory and by a frequency of a GC process [i.e., (rest of memory to reduce)×(difficulty of reducing memory)×(frequency of the compaction)]. In an embodiment, the amount of remaining memory to reduce can be determined as a difference of subtracting a current total amount of memory reduction from a dynamic heap adjustment value [i.e., (given softmx value)−(current total amount of memory reduction)]. The softmx value can be set, for example, via the JMX® library, in an embodiment, the difficulty of reducing the remaining memory can be determined from an occupancy rate of objects in a target space in the heap. In an embodiment, the frequency of the GC process can be determined based on a fragmentation rate in a target space in the heap.

At step 420, start a contraction of the heap responsive to a physical memory use of the heap approaching a limit. The contraction is started from a particular runtime system that was estimated to be slowest for the contraction from among the multiple runtime systems, based on previously determined estimates (per step 410).

At step 430, decrease the physical memory use of the heap by compacting the heap with only one Garbage Collection (GC) thread, responsive to the contraction of the heap being unable to catch up to the physical memory use.

At step 440, expand the heap, responsive to the size of the available physical memory becoming large (e.g., greater than a threshold).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided, to the consumer is to use, the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or, acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g. host firewalls).

Deployment Models are as follows:

Private cloud: the cloud infrastructure is operated solely for an organization. It may be managed by the organization or a third party and may exist on-premises or off-premises.

Community cloud; the cloud infrastructure is shared by several organizations and supports a specific community that has shared concerns (e.g., mission, security requirements, policy, and compliance considerations), it may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 aid cloud computing environment 650 can communicate with any type of computerized device over any type of network and/or network addressable connection (e.g., using a web browser).

Figure 7:
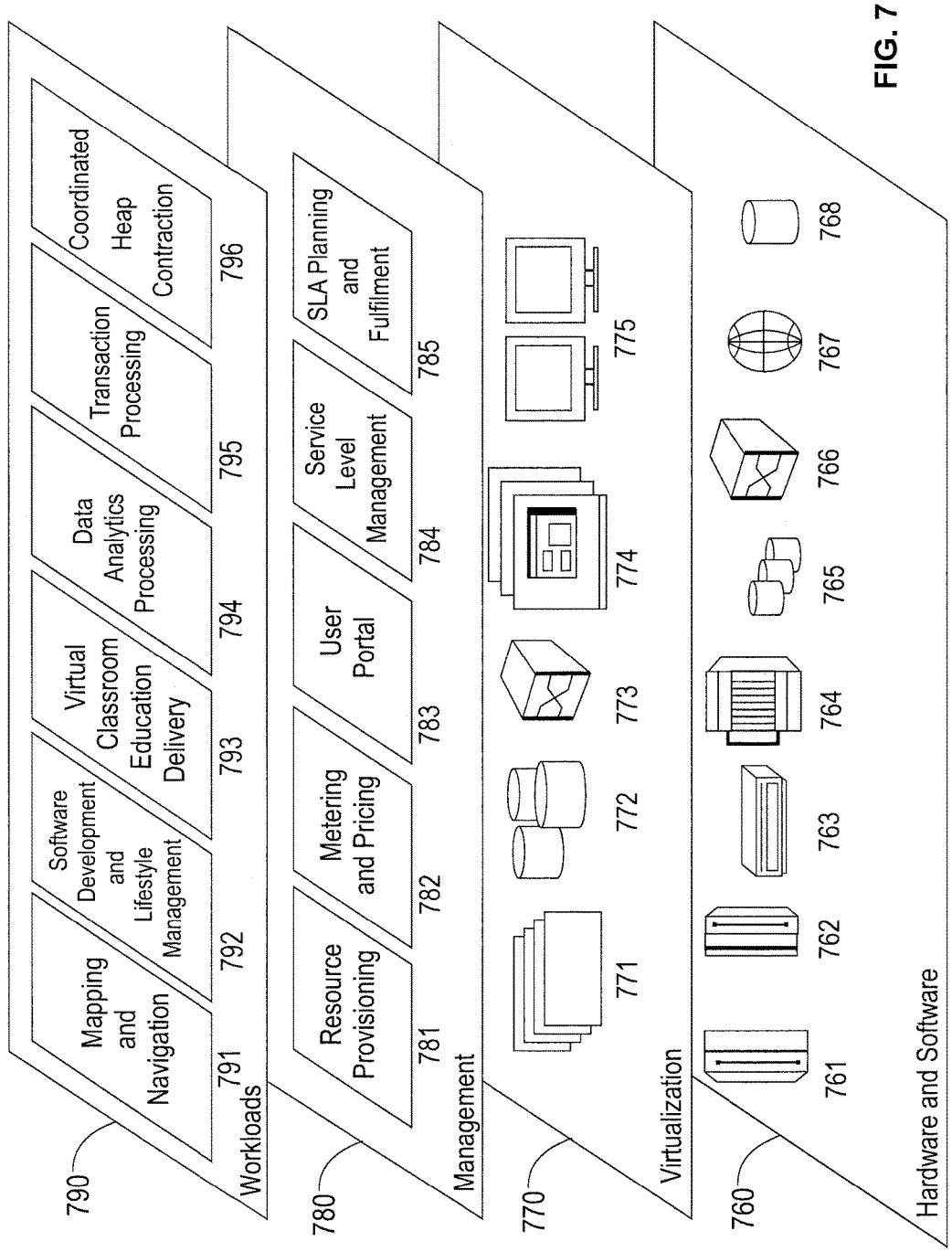
FIG. 7 shows abstraction model layers, in accordance with an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides art abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized, Examples of workloads and functions which may be provided from this layer include: mapping and navigation 791; software development and lifecycle management 792; virtual classroom education delivery 793; data analytics processing 794; transaction processing 795; and coordinated heap contraction of multiple runtimes in a cloud environment 796.

The present invention may be a system, a method, miler a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fibers-optic cable), or electrical signals transmitted through a wire.

Computer readable program, instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination, of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer for example, through the Internet using an Internet Service Provider)). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according, to embodiments of the invention. It will be understood that each block of the flowchart, illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises, an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in success on may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment, is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings, it is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for coordinated heap contraction, comprising:

starting, by a processor, a contraction of a heap responsive to a physical memory use of the heap approaching a limit, the contraction starting from a particular runtime system that was estimated to be slowest for the contraction from among a plurality of runtime systems that use the heap, based on previously determined estimates; and wherein the previously determined estimates are determined by estimating respective time periods spanned to contract the heap, wherein each of the respective time periods corresponds to a respective one of a plurality of threads;

decreasing, by the processor, the physical memory use of the heap by compacting the heap with only one Garbage Collection (GC) thread, responsive to the contraction of the heap being unable to catch up to the physical memory use.

2. The computer-implemented method of claim 1, wherein the previously determined estimates are determined by estimating respective time periods spanned to shrink the heap, wherein each of the respective time periods corresponds to a respective one of the plurality of runtime systems.

3. The computer-implemented method of claim 1, wherein the previously determined estimates are determined as a product of multiplying an amount of remaining memory to reduce by a difficulty of reducing the remaining memory and by a frequency of a GC process.

4. The computer-implemented method of claim 3, wherein the amount of remaining memory to reduce is determined as a difference of subtracting a current total amount of memory reduction from a dynamic heap adjustment value.

5. The computer-implemented method of claim 3, wherein the difficulty of reducing the remaining memory is determined from an occupancy rate of objects in a target space in the heap.

6. The computer-implemented method of claim 3, wherein the frequency of the GC process is determined based on a fragmentation rate in a target space in the heap.

7. The computer-implemented method of claim 1, wherein the previously determined estimates are determined under a condition that the physical memory use of the heap is not approaching the limit.

8. The computer-implemented method of claim 1, wherein the plurality of runtime systems are implemented in a cloud environment.

\* \* \* \* \*